UNITED STATES PATENT OFFICE.

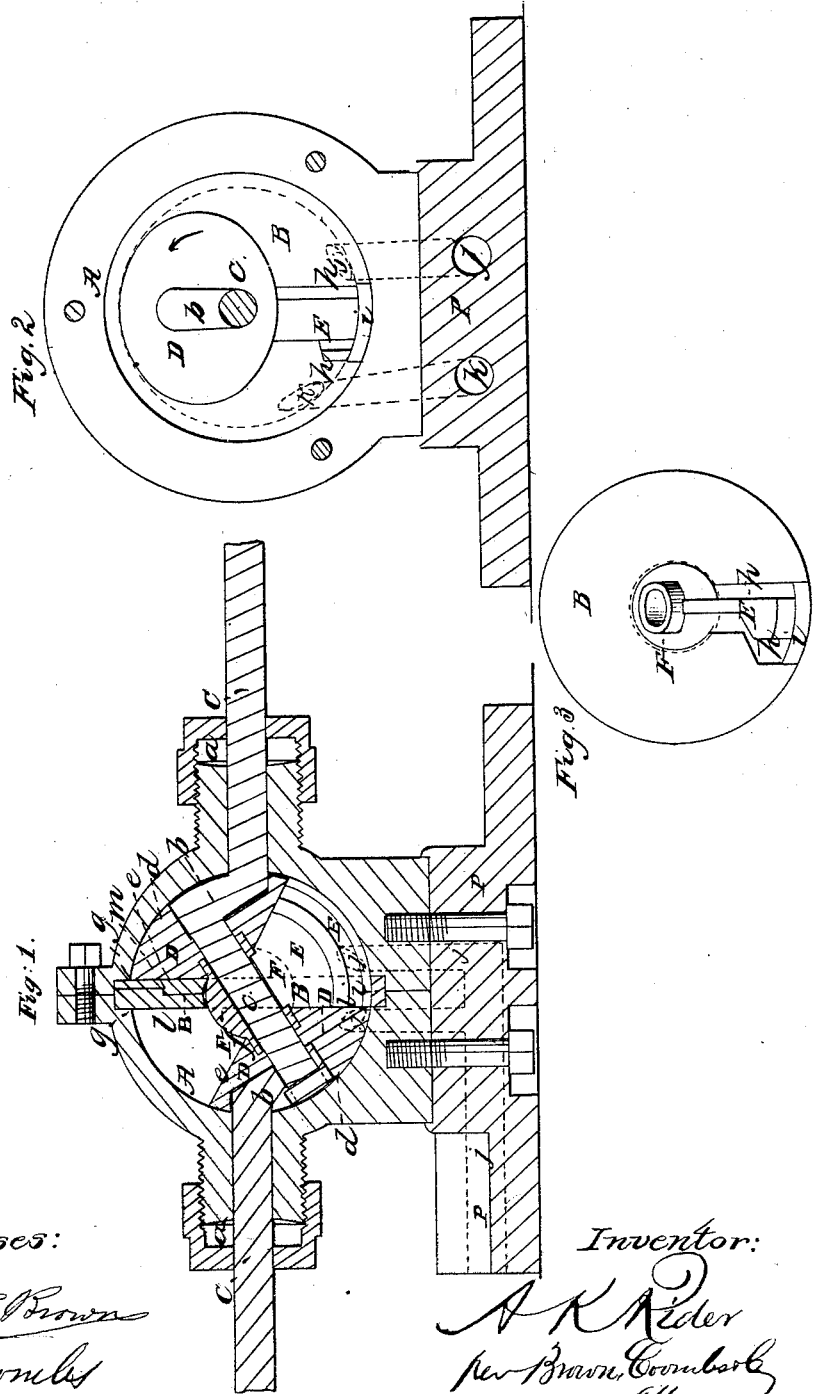

ALEXANDER K. RIDER, OF HYDEVILLE, VERMONT.

IMPROVEMENT IN ROTARY ENGINES.

Specification forming part of Letters Patent No. 45,637, dated December 27, 1864.

*To all whom it may concern:*

Be it known that I, ALEXANDER K. RIDER, of Hydeville, in the county of Rutland and State of Vermont, have invented a new and useful Improvement in Rotary Engines; and I do hereby declare that the following is a full, clear, and exact description of the same, reference being had to the accompanying drawings, forming part of this specification, in which—

Figure 1 is a vertical section of the engine directly through the axis of rotation. Fig. 2 is a vertical section of the same at right angles to Fig. 1. Fig. 3 is a face view of the partition of the cylinder and of the sliding and oscillating abutment.

Similar letters of reference indicate corresponding parts in the several figures.

This engine is composed of a cylinder of spherical or hemispherical form, a rotating obliquely-cranked shaft, a rotating piston or pistons, of what may be termed "sphero-conical" form, and an abutment having a peculiar compound oscillating movement.

To enable others skilled in the art to make and use my invention, I will proceed to describe it with reference to the drawings, which represent a double engine having its cylinder of spherical form.

A A' are two hollow hemispheres united by flanges and bolts to form the spherical cylinder bolted firmly to a suitable base, P, and having firmly secured between them a partition, B, which divides the cylinder into two hemispherical compartments. C is the shaft, passing at right angles to the partition B through stuffing-box bearings $a\ a$ in the hemispheres A A', and provided within the cylinder with two crank-arms, $b\ b'$, which are set in opposite directions and united by an oblique crank-pin, $c$. To these crank-arms are secured the two pistons D D', one of which works in one and the other in the other hemispherical compartment of the cylinder. The pistons are of what I term "sphero-conical" form, each having one face, $d$, of spherical form, to fit the internal spherical surface of the cylinder, and the opposite face $e$ of conical form, the said spherical and conical faces being concentric with each other and with the crank-pin $c$, which passes through the two pistons. The pistons thus constructed and applied are eccentric to the shaft C, the eccentricity of one being in one direction and that of the other in the opposite direction. The angles of the conical faces $e\ e$ of the pistons are such that one portion of the straight profile of each fits closely against the partition-plate B of the cylinder. This portion of the profile may be grooved and fitted with a metal packing-strip, which may be pressed toward the partition-plate by means of springs.

E is the abutment, made in the form of a sector of a circle, as shown in Fig. 1, and inserted in a slot in a collar, F, which is bored out to fit the crank-pin $c$, and the ends of which are fitted, as shown at $ff$ in Fig. 1, into recesses counterbored in the pistons around the central holes provided therein for the passage of the crank-pin. The portion of this collar between the two pistons is of spherical form externally and fitted into a bearing of corresponding form in the center of the partition B of the cylinder, as shown in Fig. 1. In order to provide for the construction of this bearing and the introduction of the spherical portion of the collar thereinto the said partition is made of two plates, which are placed face to face, and secured together by being clamped between the two hemispherical portions A A' of the cylinder, as shown at $g'$, in Fig. 1. This construction of the partition also admits of the introduction of packing around the aforesaid bearing. The abutment is parallel with the axis of the crank-pin. It passes through a radial slot, $h$, provided in the partition B. Its arc-shaped outer edge fits the internal spherical surface of the cylinder, and its ends fit snugly between the two pistons. The slot $h$ is closed at the periphery of the partition by a dovetailed piece, $i$, of metal, which also serves as packing. The sides of the said slot are rounded to permit the peculiar oscillating movement which the abutment makes therein when the engine is in operation, and they may also be fitted with suitable expanding packing. The outer edge and the ends of the abutment may also be fitted with similar packing.

There are in each hemispherical compartment of the cylinder an induction-opening or port, $j$, and an eduction-opening or port, $k$, the induction-openings being on one side of the abutment and the eduction-openings on the opposite side.

The engine may be used as a motor or as a pump; but I will describe only its operation as a steam-engine, as that will enable any skillful engineer to adapt it to pumping purposes.

Steam admitted through the induction-ports $j$ is prevented from passing the abutment E, and its pressure against the conical faces of the pistons is caused to produce their rotary motion, the shaft C rotating with them. The steam acts upon each piston until it arrives at its respective eduction-port, when its spherical surface commences to close the said port. While that portion of the piston which works in contact with the partition B is passing the narrow space between the eduction and induction ports it closes temporarily first the eduction and afterward the induction port, and so prevents the steam from passing around its upper side from the induction to the eduction port and blowing through the engine. Before it commences to uncover or open the induction-port the eduction-port is wide open again. The steam thus acts upon each piston during three-fourths or more of its revolution, and, as the two pistons are set opposite to each other, it always acts with full effect on one while it does not operate on the other. As the crank-pin C revolves with the pistons, it produces a peculiar compound oscillating motion of the abutment in the slot $h$ of the partition B of the cylinder.

The engine represented, having a spherical cylinder divided into two compartments, may be considered as a double engine, but a single engine on the same principle may be made with a hemispherical cylinder and single piston, the cylinder in such case resembling one of the compartments of the cylinder represented, a flat head being bolted on in place of the partition B. In such a case the protruding ends of the crank-pin and abutment would have to be covered by boxes or hollow bonnets bolted onto the exterior of the cylinder-head.

What I claim as my invention, and desire to secure by Letters Patent, is—

1. A rotary engine, composed of a spherical or hemispherical cylinder, a rotating obliquely-cranked shaft, a rotary piston or pistons of sphero-conical form, and an oscillating abutment, the whole combined to operate substantially as herein specified.

2. The combination of the spherical collar F, to which the abutment is attached, and the partition B, or cylinder-head, formed of two plates, $l\,m$, substantially as and for the purpose herein specified.

A. K. RIDER.

Witnesses:
F. A. BROCKWAY,
ROWLAND WALTER.